(12) United States Patent
Ohashi

(10) Patent No.: US 10,748,044 B2
(45) Date of Patent: Aug. 18, 2020

(54) PRINTER AND MEDIUM STORING PROGRAMS EXECUTABLE BY MOBILE TERMINAL

(71) Applicant: BROTHER KOGYO KABUSHIKI KAISHA, Aichi-ken (JP)

(72) Inventor: Yosuke Ohashi, Aichi-ken (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/362,602

(22) Filed: Mar. 22, 2019

(65) Prior Publication Data

US 2019/0370619 A1 Dec. 5, 2019

(30) Foreign Application Priority Data

Jun. 1, 2018 (JP) .................. 2018-106129

(51) Int. Cl.
| | |
|---|---|
| *G06K 15/02* | (2006.01) |
| *G01G 23/37* | (2006.01) |
| *G01G 23/42* | (2006.01) |
| *G01G 19/415* | (2006.01) |
| *G06F 3/12* | (2006.01) |

(52) U.S. Cl.
CPC ....... *G06K 15/024* (2013.01); *G01G 23/3721* (2013.01); *G01G 23/3742* (2013.01); *G01G 23/42* (2013.01)

(58) Field of Classification Search
None
See application file for complete search history.

(56) References Cited

U.S. PATENT DOCUMENTS

| | | | | |
|---|---|---|---|---|
| 5,574,947 A | * | 11/1996 | Massa ................... | G06F 13/385 340/9.1 |
| 5,805,807 A | * | 9/1998 | Hanson .................. | B60R 11/02 370/340 |
| 10,001,403 B2 | * | 6/2018 | Brouhard .............. | G01G 23/44 |
| 2012/0232970 A1 | * | 9/2012 | Kara ................ | G07B 17/00024 705/14.4 |

(Continued)

FOREIGN PATENT DOCUMENTS

| | | |
|---|---|---|
| JP | H06-281496 A | 10/1994 |
| JP | H09-58644 A | 3/1997 |

*Primary Examiner* — Beniyam Menberu
(74) *Attorney, Agent, or Firm* — Kenealy Vaidya LLP

(57) ABSTRACT

A printing apparatus communicates with a weight measuring apparatus and a mobile terminal. The weight measuring apparatus transmits measuring data of weight of a measurement object, and the mobile terminal transmits a data acquisition command requesting for transmission of the measuring data. The printing apparatus includes a head to execute printing on a print medium, and a controller. The controller is configured to: receive the data acquisition command from the mobile terminal; change a state of the printer from an instruction waiting state to a data reception waiting state; receive a second measuring data transmitted from the weight measuring apparatus; transmit the second measuring data to the mobile terminal; receive a print command corresponding to the second measuring data from the mobile terminal; and control the head based on the received print command to perform the printing, on the print medium, corresponding to the second measuring data.

7 Claims, 12 Drawing Sheets

(56) References Cited

U.S. PATENT DOCUMENTS

| | | | |
|---|---|---|---|
| 2013/0133958 A1* | 5/2013 | Crooks | G01G 23/017 |
| | | | 177/1 |
| 2014/0252090 A1* | 9/2014 | Bostwick | G06Q 20/203 |
| | | | 235/383 |
| 2019/0114845 A1* | 4/2019 | Mudalgi | G07B 17/00024 |
| 2019/0234791 A1* | 8/2019 | Delgado | G01G 19/4144 |
| 2019/0250025 A1* | 8/2019 | Dixon, Jr. | B65D 25/02 |
| 2019/0369925 A1* | 12/2019 | Ishii | G06F 3/1284 |
| 2019/0369926 A1* | 12/2019 | Miyashita | H04N 1/00323 |

\* cited by examiner

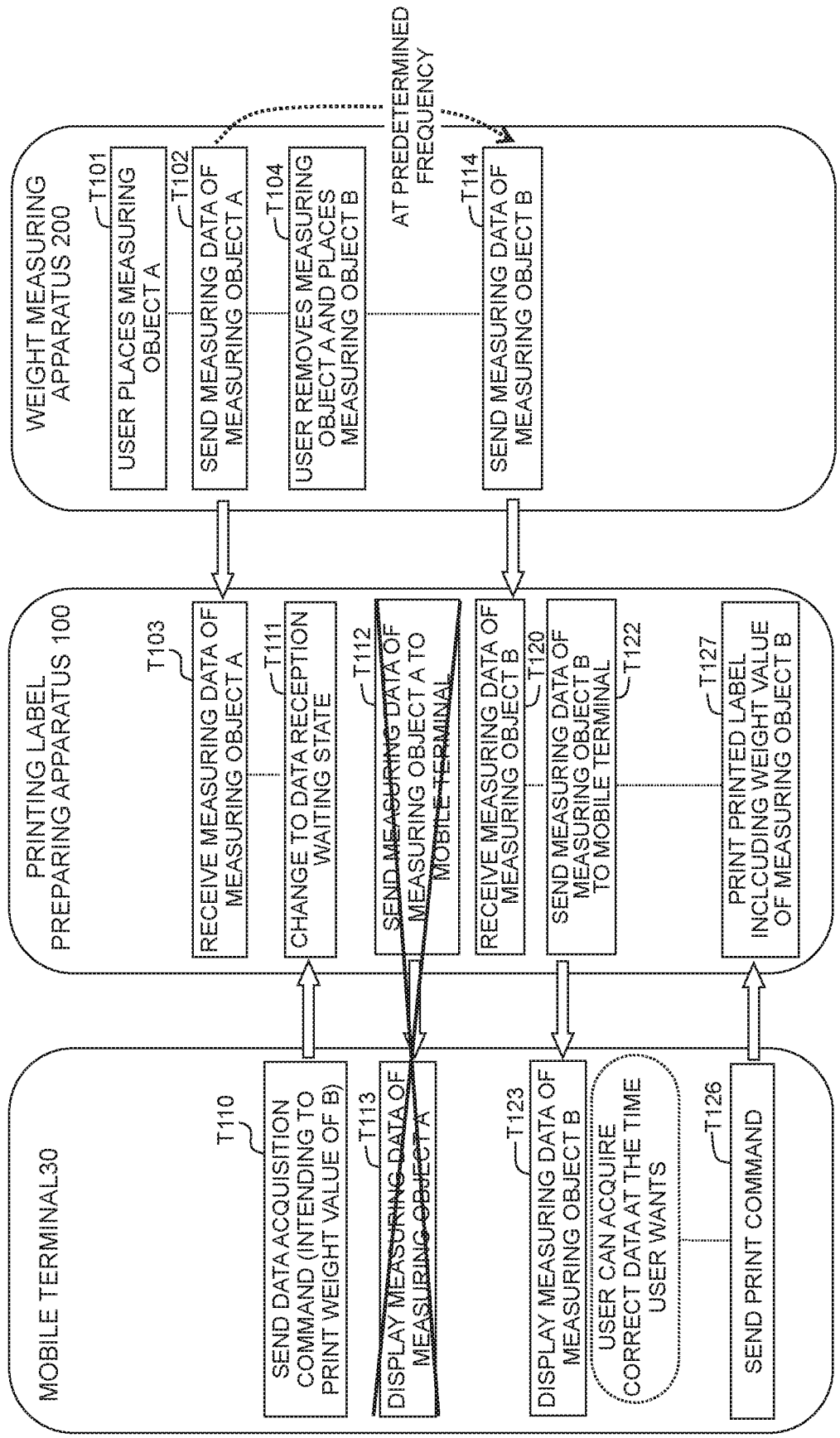
Fig. 7 EMBODIMENT

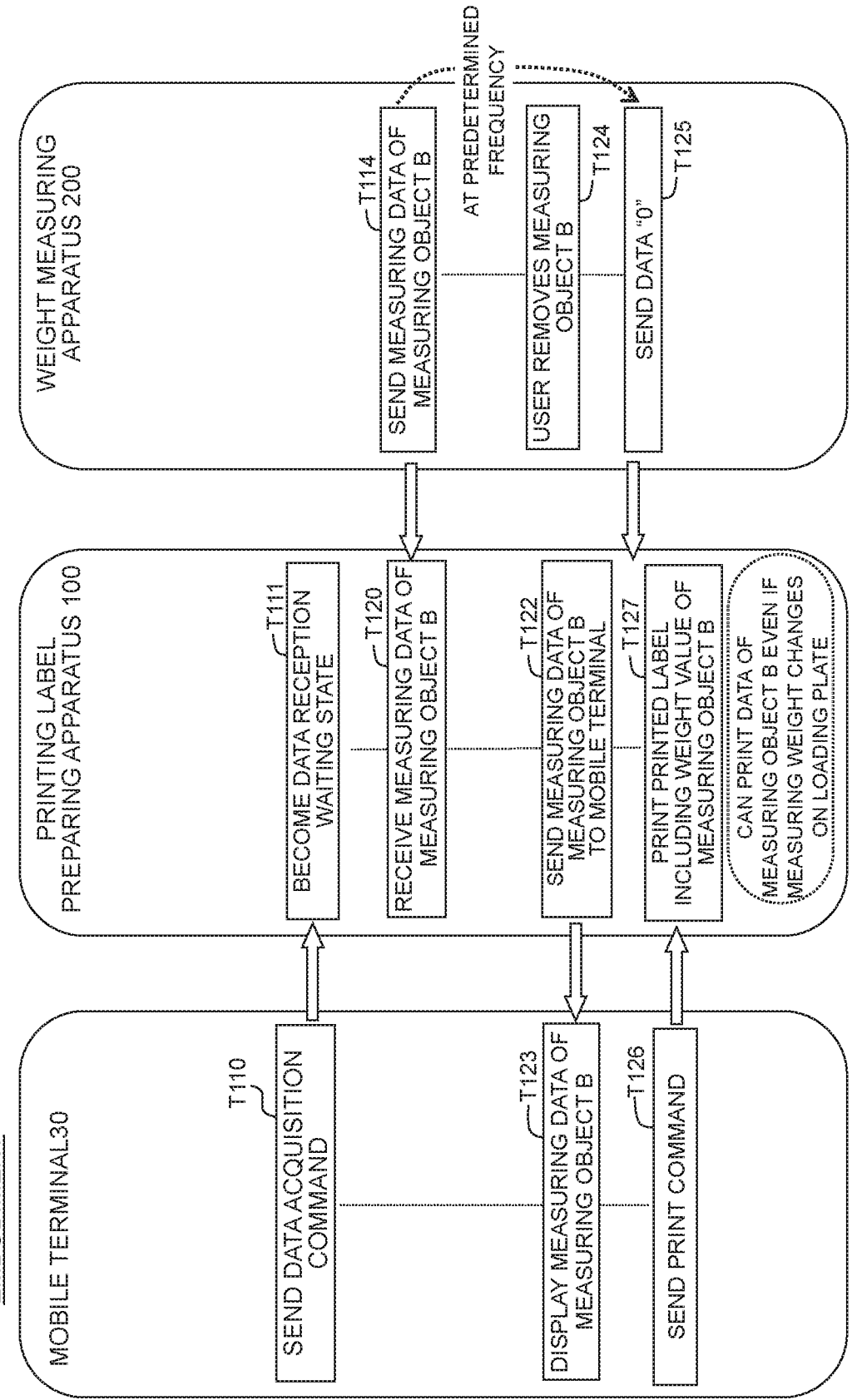
Fig. 8 EMBODIMENT

PRINTER AND MEDIUM STORING PROGRAMS EXECUTABLE BY MOBILE TERMINAL

CROSS REFERENCE TO RELATED APPLICATION

The present application claims priority from Japanese Patent Application No. 2018-106129 filed on Jun. 1, 2018 the disclosure of which is incorporated herein by reference in its entirety.

BACKGROUND

Field of the Invention

The present invention relates to a printer connectable to a weight measuring apparatus, and a medium storing programs executable by a mobile terminal.

Description of the Related Art

There is a known configuration in which a printer is connected to a weight measuring apparatus to be used for measuring the weight of a measurement object (see Japanese Patent Application Laid-open No. H9-58644, for example). With this conventional technique, the weight measuring apparatus (a weighing apparatus) and the printer (a label printer) are connected through a communication cable. If the weight of a measurement object (an item) is measured with the weight measuring apparatus, then a measuring data (a weighing data) thereof is inputted from a communication port of the printer, and a label is issued on which the contents of the data are printed.

SUMMARY

However, with the above conventional technique, the printer is prepared in advance as a dedicated device for the above weight measuring apparatus, and used while being integrally connected with the weight measuring apparatus. Therefore, it is not possible to use the printer for general purposes except for weight measurement with the weight measuring apparatus.

An object of the present teaching is to provide a printer which can be used not only for a weight measuring apparatus to measure weight but also for a general-purpose other than that.

According to a first aspect of the present teaching, there is provided a printer configured to communicate with a weight measuring apparatus and a mobile terminal, the weight measuring apparatus being configured to transmit a measuring data of weight of a measurement object, the mobile terminal being configured to transmit a data acquisition command requesting for transmission of the measuring data, the printer comprising: a head configured to perform printing on a print medium; and a controller, wherein the controller is configured to: receive the data acquisition command from the mobile terminal; change a state of the printer from an instruction waiting state to a data reception waiting state after receiving the data acquisition command, the instruction waiting state being a state in which a first measuring data transmitted from the weight measuring apparatus is not received by the printer; receive a second measuring data transmitted from the weight measuring apparatus after changing the state of the printer from the instruction waiting state to the data reception waiting state; transmit the second measuring data to the mobile terminal; receive a print command corresponding to the second measuring data from the mobile terminal; and control the head based on the received print command to perform the printing, on the print medium, corresponding to the second measuring data.

According to a second aspect of the present teaching, there is provided a non-transitory computer-readable medium storing programs executable by a processor of a mobile terminal which is connectable to a printer, the printer being connectable to a weight measuring apparatus which is configured to transmit weight data of a measurement object being weighed at a predetermined period, the mobile terminal comprising a display, an operation part, and the processor, the programs, when executed by the processor, causing the mobile terminal to: transmit, to the printer, a data acquisition command requesting for transmission of the weight data; receive the weight data transmitted via the printer from the weight measuring apparatus after the printer receives the data acquisition command; display a measuring result, on the display, corresponding to the weight data received via the printer; and transmit, to the printer, a print command instructing the printing corresponding to the weight data received via the printer, based on an operation on the operation part after displaying the measuring result on the display.

According to the first and second aspects of the present teaching, the printer is configured to communicate with the weight measuring apparatus and the mobile terminal and, based on a user's operation on the mobile terminal, to carry out the printing in correspondence with the weight measuring result from the weight measuring apparatus. By virtue of this, differently from the case where the printer is used as a dedicated device being integrally linked with a weight measuring apparatus, it is also possible to use the printer for general purposes other than for the weight measuring apparatus to carry out weight measuring. Further, with the printer connected to the mobile terminal, differently from the case where the printer is connected to a non-portable PC terminal, it is possible for the user to carry out various operations for the printing based on the weight measuring result without needing to choose place.

Further, the weight measuring apparatus transmit the weight measuring data for the measurement object to the printer. Therefore, depending on the timing for the user to deal with the measurement object, it is undesirably possible to print with a different measuring data from the weight measuring data for the measurement object with which the user desires to print.

Hence, according to the first and second aspects of the present teaching, the controller of the printer is configured to carry out the following procedures. That is, the printer usually stays in the instruction waiting state. Then, if the data acquisition command is received from the mobile terminal based on the user's operation, then the printer shifts from the instruction waiting state to the data reception waiting state. On this occasion, the printer transmits to the mobile terminal the measuring data (the second measuring data) received after the shifting to the data reception waiting state, among the measuring data transmitted from the weight measuring apparatus, as described earlier on. That is, the printer in the instruction waiting state does not transmit to the mobile terminal the measuring data (the first measuring data) transmitted from the weight measuring apparatus. Then, by the user's appropriate operation on the mobile terminal according to the received second measuring data, the print command is transmitted from the mobile terminal.

If the printer receives the print command, then the head carries out the printing corresponding to the second measuring data on the print medium.

According to the first and second aspects of the present teaching, the printer transmits to the mobile terminal the second measuring data received from the weight measuring apparatus after the data acquisition command is received from the mobile terminal. Further, the printer then follows the print command received from the mobile terminal to carry out the printing corresponding to the second measuring data. Because the printing on the print medium is carried out with the measuring data of the time when the user operates on the mobile terminal for transmitting the data acquisition command, it is possible to prevent printing out any measuring data different from the user's intention.

According to the first and second aspects of the present teaching, it is possible to use the printer not only for the weight measuring apparatus to measure a weight but also for general purposes other than that.

BRIEF DESCRIPTION OF THE DRAWINGS

FIG. 7 is an illustrative view for explaining an example of a temporal data flow according to an embodiment of the present teaching.

FIG. 8 is another illustrative view for explaining another example of the temporal data flow according to the embodiment of the present teaching.

DESCRIPTION OF THE EMBODIMENT

Hereinbelow, referring to the accompanying drawings, an embodiment of the present teaching will be explained.

<Outline of the System>

Figure 1:
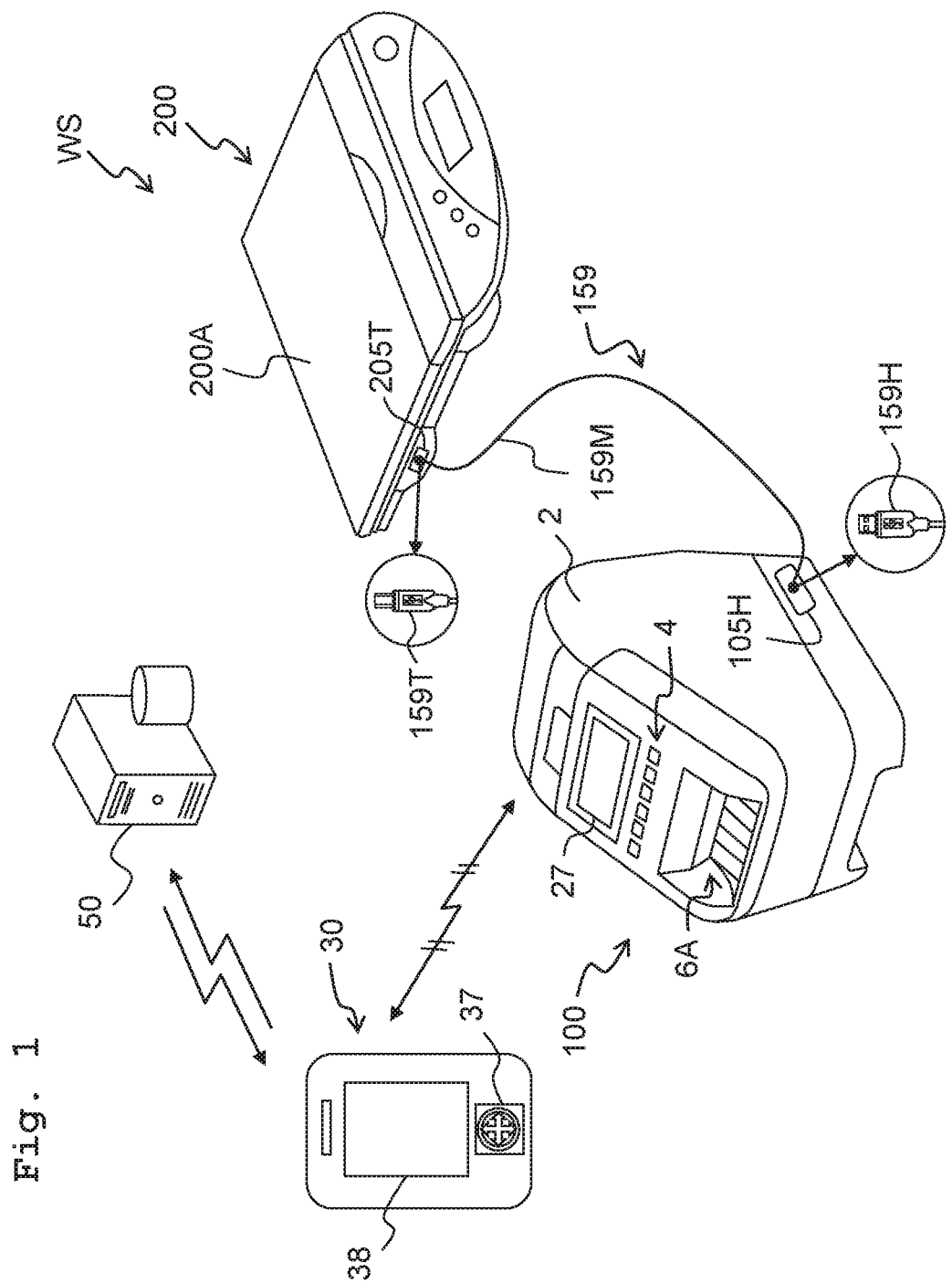
FIG. 1 is a schematic configuration diagram depicting a weighing system according to the present teaching.

As depicted in FIG. 1, a weighing system WS includes a printing label preparing apparatus 100 as a printer, a mobile terminal 30, a server 50, and a weight measuring apparatus 200 (a weighing apparatus). The printing label preparing apparatus 100 and the weight measuring apparatus 200 are connected with a USB cable 159 in an information transmittable and receivable manner (the details thereof will be described later on). Further, the printing label preparing apparatus 100 and the mobile terminal 30 are connected in an information transmittable and receivable manner by an appropriate wireless communication such as Wi-Fi (trademark), Bluetooth (trademark), another wireless LAN, or the like (the details thereof will be described later on). Further, the server 50 and the mobile terminal 30 are also connected in an information transmittable and receivable manner by an appropriate wireless communication.

The mobile terminal 30 is an information terminal such as, for example, a PDA (Portable Digital Assistant), a smartphone (a cellphone provided with a PDA function), or the like. The mobile terminal 30 has a display 38 such as a liquid crystal display or the like, and an operation part 37 made from, for example, a keyboard, a mouse, buttons, and the like. The mobile terminal 30 is capable of sending instruction signals to the printing label preparing apparatus 100 via the aforementioned wireless communication (the details thereof will be described later on).

The printing label preparing apparatus 100 includes a main body casing 2. The main body casing 2 is formed at the front side with a discharge port 6A to discharge a printed tape for label-print 20A to the outside (see aftermentioned FIG. 4). A liquid crystal display 27 (LCD) and a key input part 4 are arranged on a front surface portion of the main body casing 2 above the discharge port 6A. The liquid crystal display 27 displays various screens and the like under the control of an aftermentioned CPU 44. The key input part 4 includes a plurality of keys (six in this embodiment). Further, the main body casing 2 is provided with a socket for host 105H.

The weight measuring apparatus 200 includes a platform 200A to place a measurement object whose weight is to be measured, and a socket for target 205T.

The USB cable 159 includes a first connector 159H causing a connecting device to function as a host (device), a second connector 159T causing another connecting device to function as a target (device), and a cable 159M provided between the first connector 159H and the second connector 159T, respectively. In this embodiment, in the USB cable 159, the first connector 159H is fitted (connected) to the socket for host 105H of the printing label preparing apparatus 100 while the second connector 159T is fitted to the socket for target 205T of the weight measuring apparatus 200. Therefore, to explain about a functional relation between the printing label preparing apparatus 100 and the weight measuring apparatus 200, the printing label preparing apparatus 100 functions as the host device while the weight measuring apparatus 200 functions as the target device.

<Electrical Configuration of the Mobile Terminal and the Server>

Figure 2:
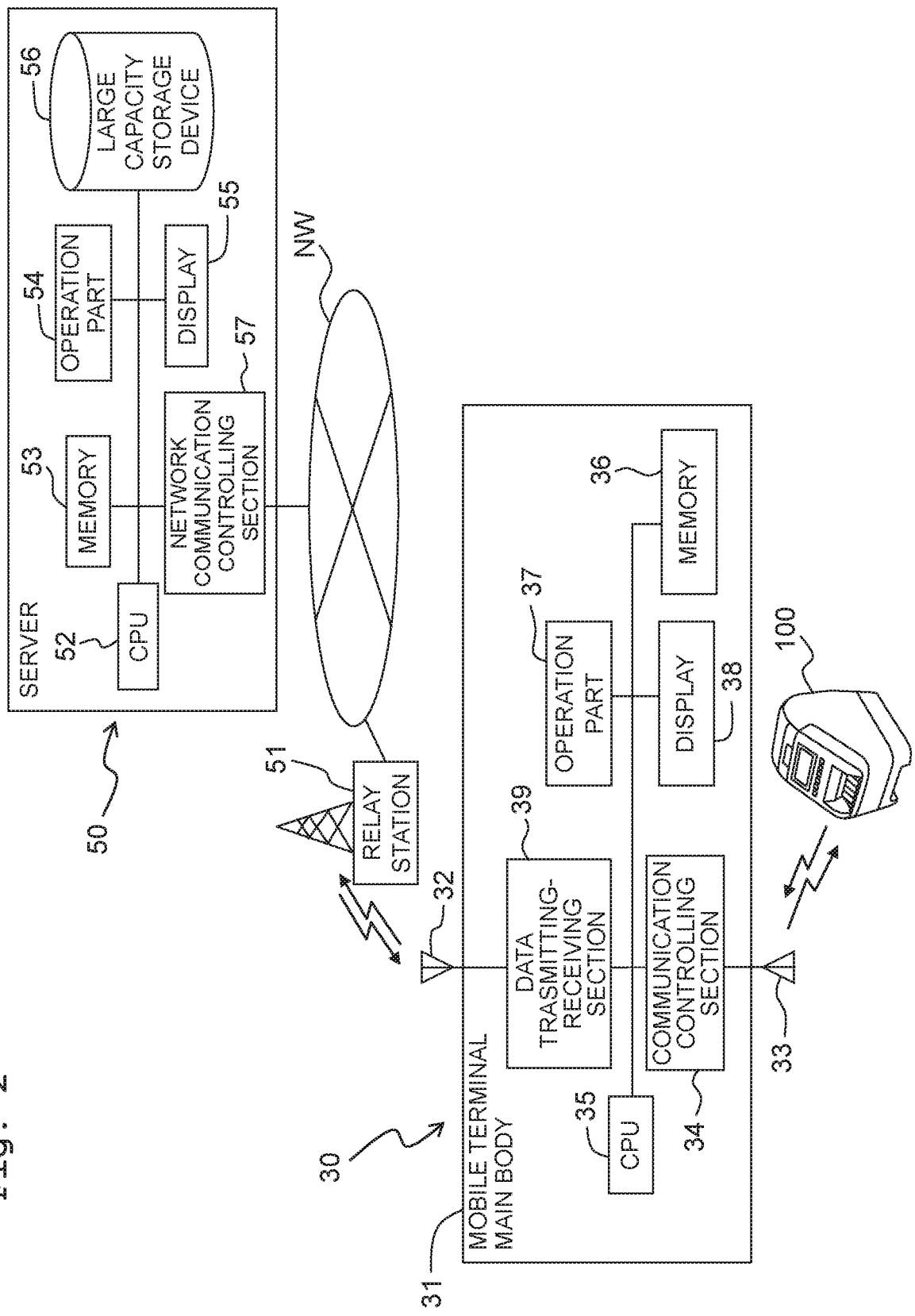
FIG. 2 is a functional block diagram depicting an electrical configuration of a server and a mobile terminal.

FIG. 2 will be used for an explanation of an electrical configuration of the mobile terminal 30 and the server 50.

In FIG. 2, according to this embodiment, the server 50 is connected to a relay station 51 carrying out wireless communication with the mobile terminal 30 via a network NW. In correspondence with that, the mobile terminal 30 includes a mobile terminal main body 31, a first antenna 32 for carrying out the wireless communication with the network NW via the relay station 51, and a second antenna 33 for carrying out the abovementioned wireless communication with the printing label preparing apparatus 100.

Figure 4:
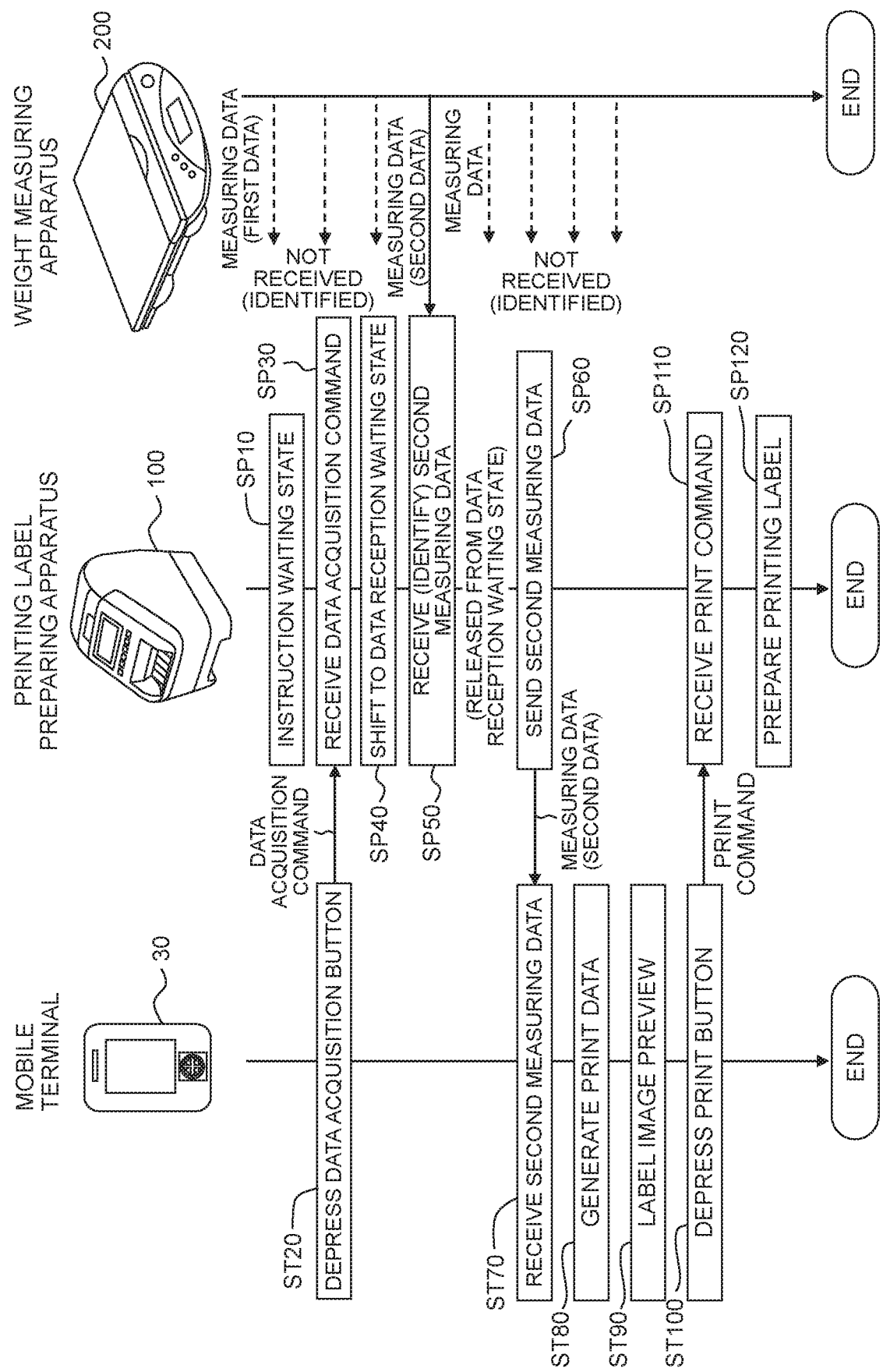
FIG. 4 is a sequence diagram (time chart) depicting a processing procedure carried out in the mobile terminal, the printing label preparing apparatus, and the weight measuring apparatus.

The mobile terminal main body 31 includes: a CPU 35, a memory 36 made from ROM, RAM, and/or the like storing print processing programs related to an aftermentioned sequence execution depicted in FIG. 4, the aforementioned operation part 37 to which instructions and information are inputted from a user, the aforementioned display 38 displaying various kinds of information and message, a data transmitting-receiving section 39 transmitting and receiving various data and signals to and from the relay station 51 via the first antenna 32, and a communication controlling section 34 carrying out the aforementioned wireless communication with the printing label preparing apparatus 100 via the second antenna 33.

The server 50 includes, in this embodiment, a CPU 52, a memory 53 made from, for example, RAM, ROM, and the like, an operation part 54, a display 55, a large capacity storage device 56, and a network communication controlling section 57 for controlling the communication of information signals to and from the mobile terminal 30 via the network NW and the relay station 51.

<Printing Label Preparing Apparatus>

Figure 3:
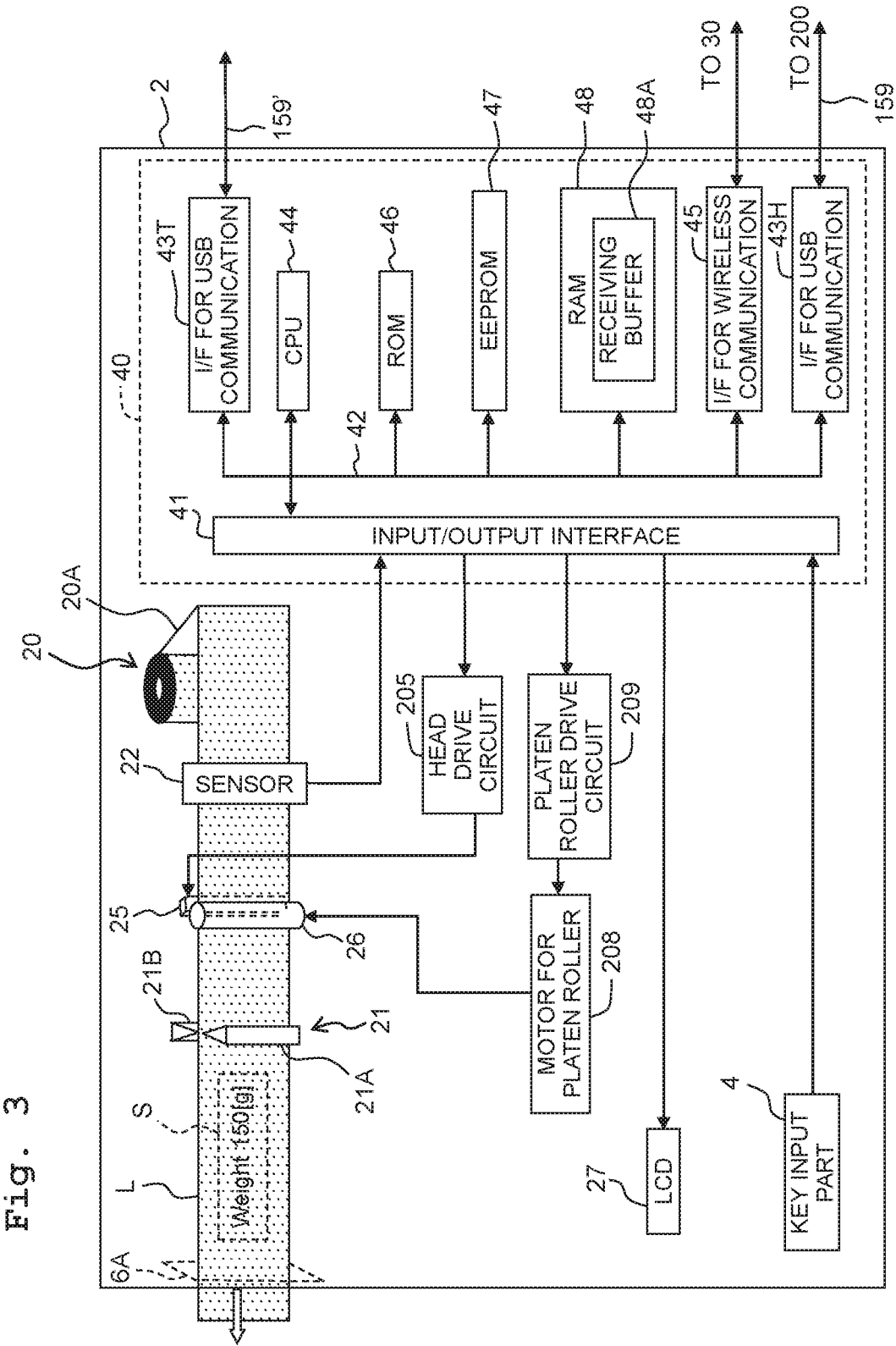
FIG. 3 is a functional block diagram depicting a detailed configuration of a printing label preparing apparatus.

Next, FIG. 3 will be used for explaining a detailed configuration of the printing label preparing apparatus 100.

In FIG. 3, the main body casing 2 accommodates a tape roll for label-print 20 on which the tape for label-print 20A of a predetermined width (an example of the print medium) is rolled. The tape for label-print 20A is constructed from an elongate self-chromogenic thermosensitive sheet (a so-called thermo-paper), and a release paper on which one side of the thermosensitive sheet is attached via an adhesive. The tape roll for label-print 20 is, for example, accommodated in a cartridge and, in the main body casing 2, a cartridge holder (not depicted) is provided to removably hold the cartridge. Note that without using the cartridge as described above, the tape roll for label-print 20 may be directly accommodated in the main body casing 2. Then, the tape roll for label-print 20 may be configured to reel out the tape for label-print 20A while the tape roll for label-print 20 is being rotated in the main body casing 2.

The tape for label-print 20A is reeled out from the tape roll for label-print 20 and conveyed by a platen roller 26. The platen roller 26 is driven by a motor for platen roller 208 whereby the tape for label-print 20A is reeled out from the tape roll for label-print 20 while being conveyed. A platen roller drive circuit 209 controls the motor for platen roller 208. The tape for label-print 20A to be conveyed is nipped between a thermal head 25 (an example of the head) and the platen roller 26, and led to the discharge port 6A. Note that if the tape for label-print 20A is provided with an appropriate identification mark, then a sensor 22 will detect the mark and output a corresponding detection signal.

The thermal head 25 includes a plurality of heater elements along a direction orthogonal to a conveyance direction for the tape for label-print 20A. The platen roller 26 is arranged on the side facing the surface provided with the heater elements of the thermal head 25. The heater elements are powered according to a dot pattern data for printing and, thereby, desirable text characters and the like are printed in a print area S of the tape for label-print 20A passing through between the thermal head 25 and the platen roller 26. A head drive circuit 205 controls the drive (powering control) of the respective heater elements provided on the thermal head 25.

In this embodiment, a cutter unit 21 is arranged at the inner side of the discharge port 6A, including a movable blade 21A and a fixed blade 21B. The tape for label-print 20A printed by the thermal head 25 is cut up along a width direction orthogonal to the tape conveyance direction to become a printed label L of a predetermined length and then discharged from the discharge port 6A (see aftermentioned FIG. 5), by way of such a reciprocation of the movable blade 21A on a predetermined time schedule as caused by an actuator (not depicted) such as a motor, a solenoid, or the like for the cutting. Note that manual cutting may also be adopted for the user to manually reciprocate the movable blade 21A for the cutting, without using an automatic cutting operation with the driving force of such kind of actuator. Alternatively, the cutting may also be carried out by way of displaying on the liquid crystal display 27 or the like that the tape for label-print 20A has been conveyed to reach a predetermined cutting position, such that the user, who has seen that display, manipulates a predetermined cutting button of the key input part 4 to cause the actuator to move the movable blade 21A.

Further, in FIG. 3, a control circuit 40 is arranged on a control board (not depicted) in the main body casing 2.

The control circuit 40 is provided with the CPU 44 (an example of the controller) and, via a data bus 42, the CPU 44 is connected with an input/output interface 41, a ROM 46, a flash memory 47 (EEPROM), a RAM 48, interfaces for USB communication 43T and 43H, and an interface for wireless communication 45.

The input/output interface 41 is connected with the head drive circuit 205, the platen roller drive circuit 209, the liquid crystal display 27, and the key input part 4.

The interface for USB communication 43H carries out information communication (for example, serial communication or the like) with the weight measuring apparatus 200 as the target device, via the socket for host 105H by using the USB cable 159. Further, the interface for wireless communication 45 carries out the aforementioned wireless communication with the second antenna 33 of the mobile terminal 30. Note that although without a detailed explanation, the interface for USB communication 43T can carry out information communication with the host device via a USB cable 159', through a socket for target.

The RAM 48 temporally stores various computation results computed by the CPU 44. The RAM 48 is provided with a receiving buffer 48A for expanding or retrieving and keeping the data received from the mobile terminal 30 and/or the weight measuring apparatus 200, a work memory (not depicted) for storing various computation data, and the like.

The ROM 46 stores various programs needed for control such as a control program for reading out, for example, a print data retrieved in the receiving buffer 48A to drive the thermal head 25 and/or the motor for platen roller 208, a control program for carrying out the sequence depicted in FIG. 4, and the like.

The CPU 44 carries out a process according to the programs stored beforehand in the ROM 46 while using the temporal storage function of the RAM 48, so as to control the overall operation of the printing label preparing apparatus 100.

According to this embodiment with the above basic configuration, the measuring data outputted from the weight measuring apparatus 200 and inputted to the printing label preparing apparatus 100 is transferred to the mobile terminal 30 by way of an appropriate instructing operation (which will be described later on) sent from the mobile terminal 30. Then, a print data corresponding to that measuring data is generated in the mobile terminal 30 and, by inputting the print data to the printing label preparing apparatus 100, a printed label is prepared with a print notation (aftermentioned) corresponding to the measuring data. One characteristic of this embodiment lies in the input/output behavior of the signals and data from the input of the measuring data to the preparation of the printed label in the above manner. Hereinbelow, details therefor will be described in sequence.

<Processing Sequence with the Mobile Terminal, Printing Label Preparing Apparatus and Weight Measuring Apparatus>

Figure 9A:
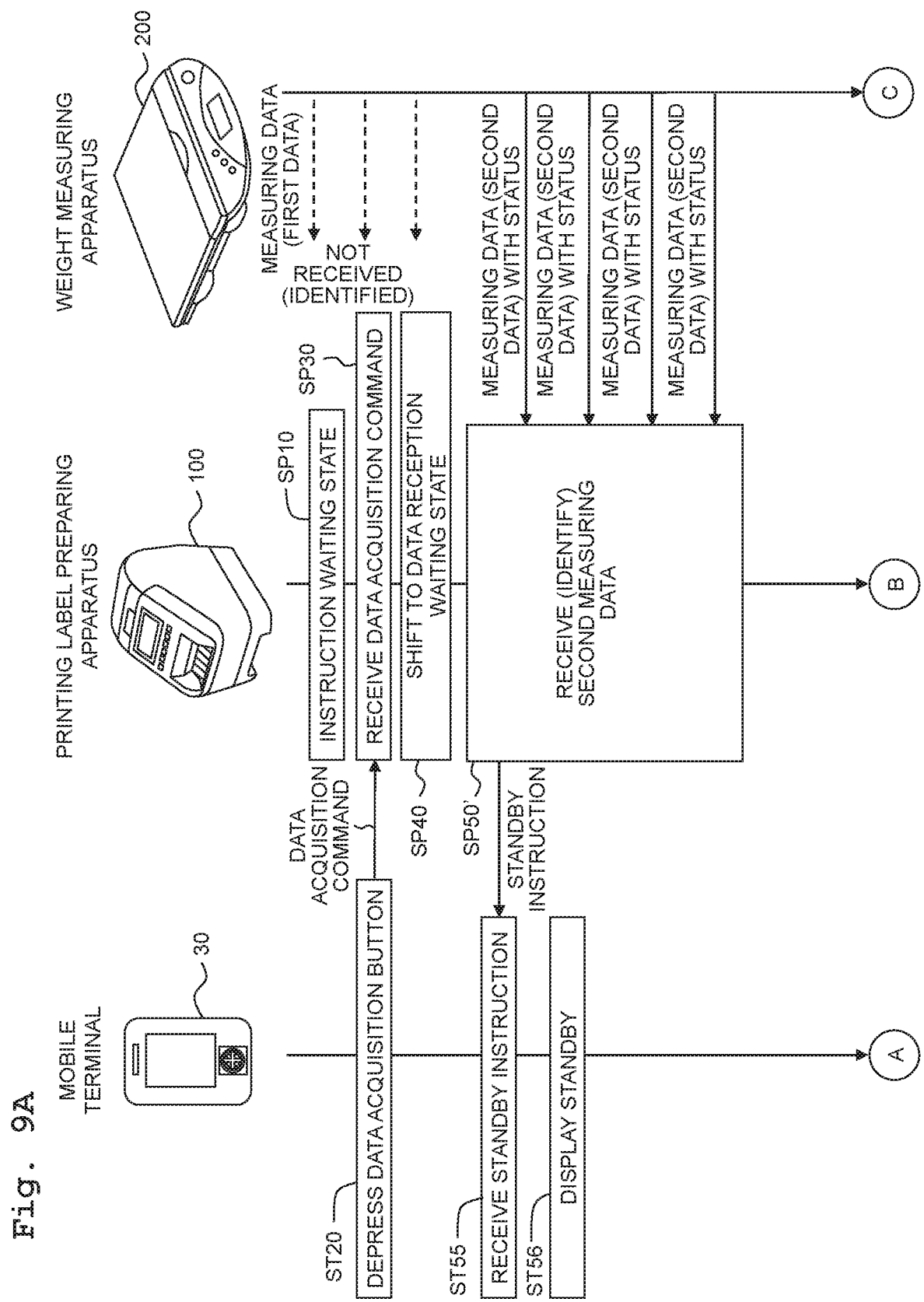
FIGS. 9A and 9B are a sequence diagram (time chart) depicting a processing procedure carried out in the mobile terminal, the printing label preparing apparatus, and the weight measuring apparatus, according to a modified embodiment.
Figure 9B:
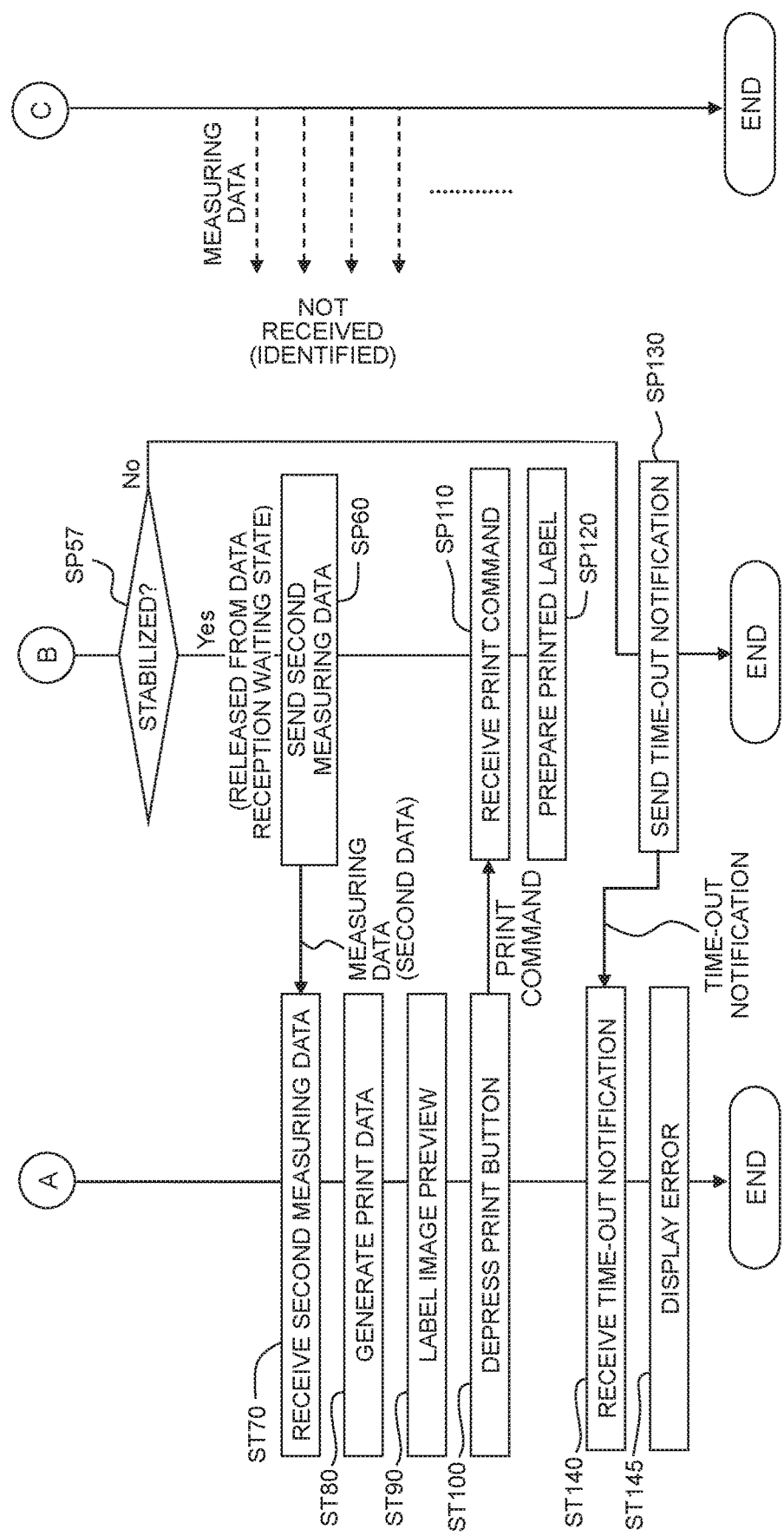
Figure 10A:
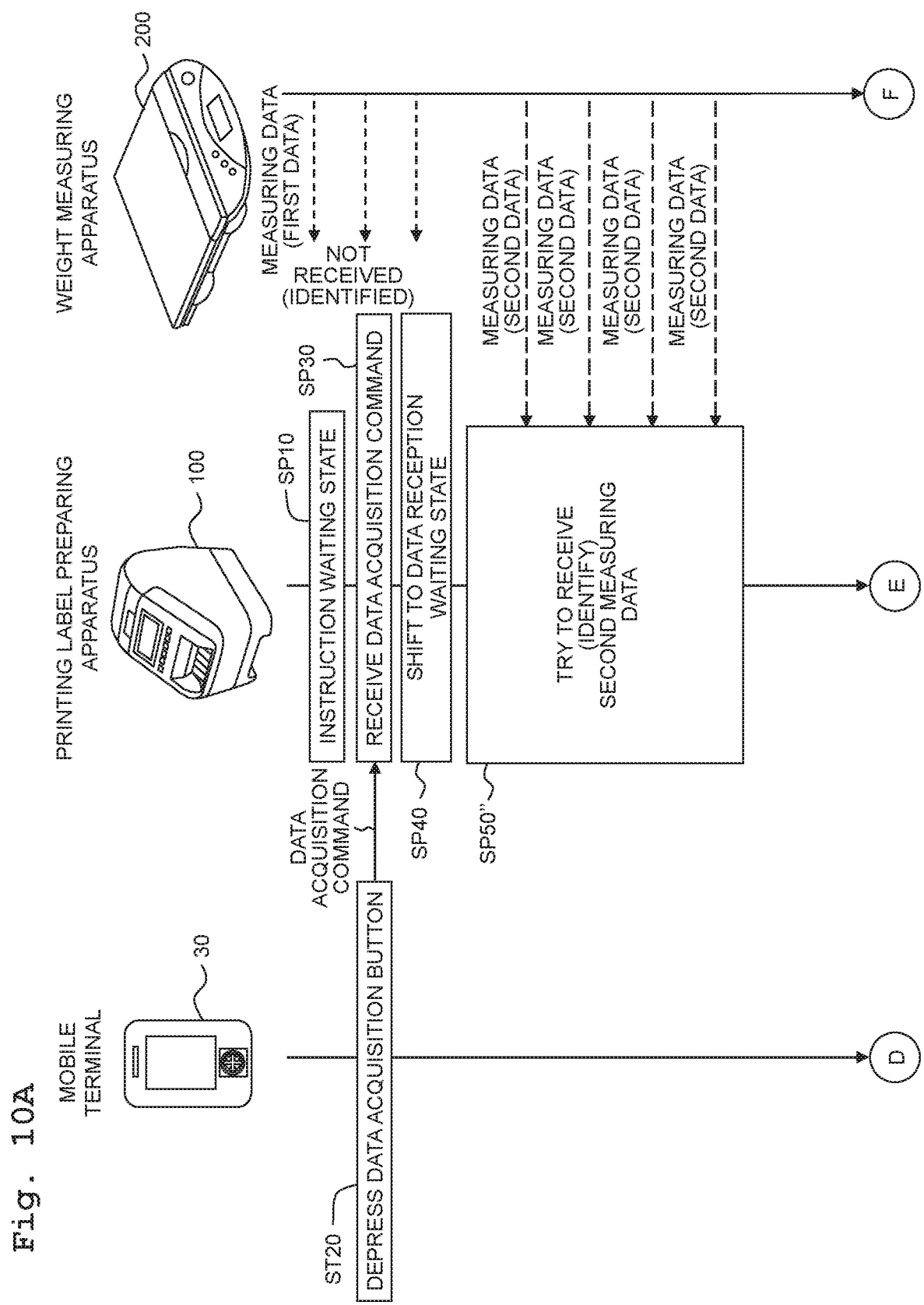
FIGS. 10A and 10B are a sequence diagram (time chart) depicting a processing procedure carried out in the mobile terminal, the printing label preparing apparatus, and the weight measuring apparatus, according to another modified embodiment.
Figure 10B:
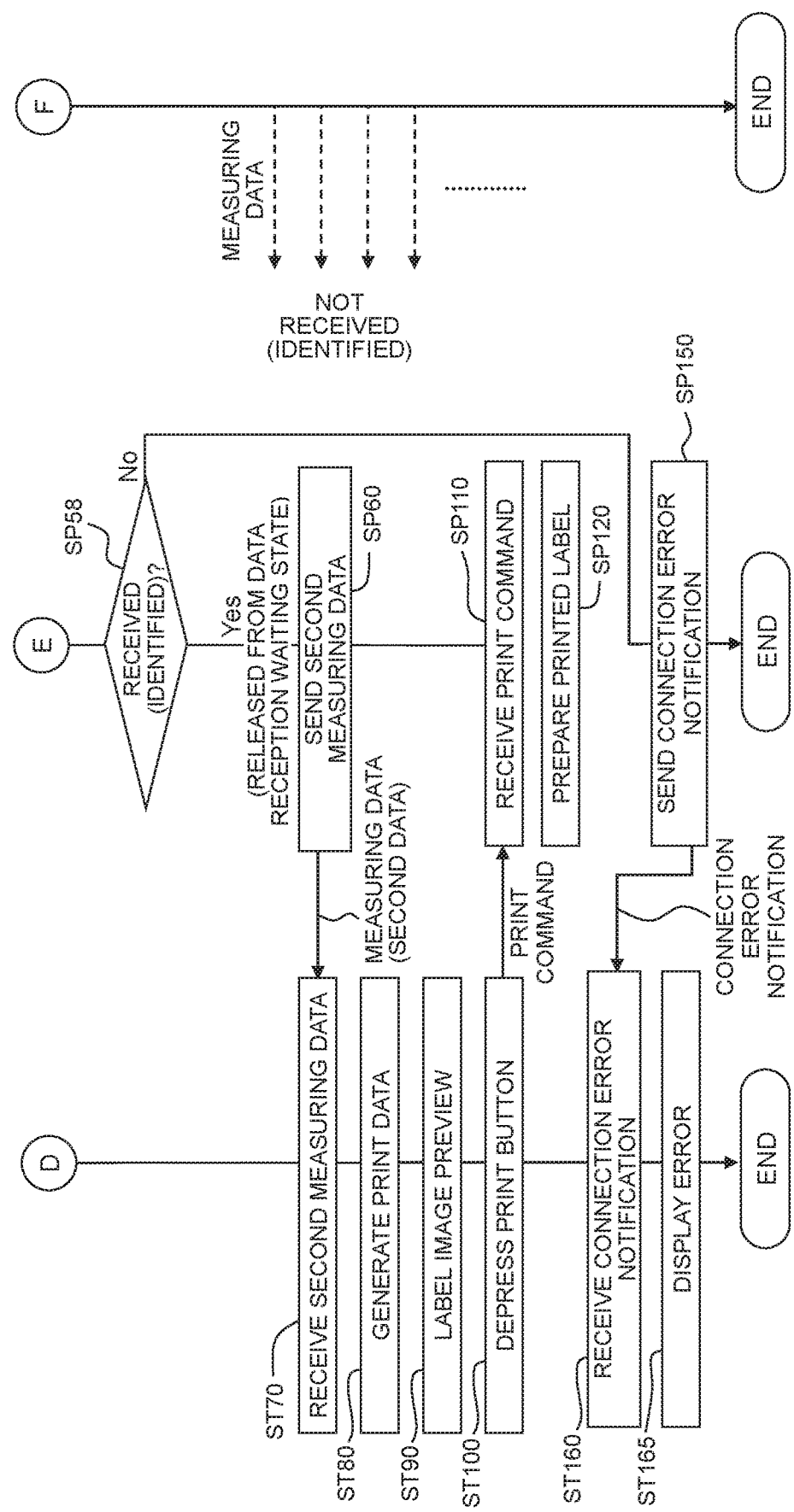

Referring to FIG. 4, an explanation will be made about a processing procedure carried out by the mobile terminal 30, the printing label preparing apparatus 100, and the weight measuring apparatus 200 for preparing a printed label. Note that as already described, the procedure carried out by the mobile terminal 30 is a process carried out by the CPU 35 on the basis of the print processing programs stored in the ROM. The procedure carried out by the printing label preparing apparatus 100 is a process carried out by the CPU 44 on the basis of the control program stored in the ROM 46 (much the same is true on aftermentioned FIGS. 9 and 10).

With the mobile terminal 30, the printing label preparing apparatus 100 and the weight measuring apparatus 200 being respectively connected as described earlier on (being capable of information transceiving), the printing label preparing apparatus 100 stays in an instruction waiting state to wait for receiving an aftermentioned data acquisition command (step SP10).

Then, if the user presses a data acquisition button (not depicted) provided in the operation part 37 of the mobile terminal 30, then the CPU 35 generates the data acquisition command for an aftermentioned request of sending the measuring data and outputs the same to the printing label preparing apparatus 100 (step ST20). The printing label preparing apparatus 100 receives the outputted data acquisition command (step SP30). Then, with the data acquisition command received, the printing label preparing apparatus 100 shifts from the current instruction waiting state to a data reception waiting state (step SP40).

On the other hand, after the power is on, the weight measuring apparatus 200 sends, for example, the measuring data depicting the weight measuring result of a measurement object laid on the platform 200A to the printing label preparing apparatus 100 repeatedly at a predetermined period. However, in the instruction waiting state until shifting to the data reception waiting state as described above, the printing label preparing apparatus 100 does not receive (identify) the measuring data (an example of the first measuring data) sent as above. As a specific method therefor, for example, it is conceivable that the printing label preparing apparatus 100 closes up the input port for signals from the weight measuring apparatus 200 so as not to input the measuring data, or inputs the measuring data but does not identify the same, or inputs the measuring data but does not store and keep the same at all, or inputs and identifies the measuring data but does not carry out any other processes at all (that is, reads in the measuring data but abandons the same), or the like.

Then, right after shifting to the data reception waiting state as in the above manner, the printing label preparing apparatus 100 receives (identifies) the measuring data (an example of the second measuring data) outputted from the weight measuring apparatus 200 as described earlier on. Note that after receiving (identifying) the measuring data, the printing label preparing apparatus 100 is released form the data reception waiting state and, again, comes into the state of not receiving (identifying) the measuring data (an example of the third measuring data) sent from the weight measuring apparatus 200. After being released from the reception waiting state, the printing label preparing apparatus 100 transfers the measuring data (the second measuring data) received (identified) in the step SP50 to the mobile terminal 30 (step SP60).

The mobile terminal 30 receives the measuring data (the second measuring data) transferred from the printing label preparing apparatus 100 in the above manner (step ST70). Thereafter, the mobile terminal 30 reads out the weight measuring result of the measurement object in the weight measuring apparatus 200 from the received measuring data, and generates a print data for preparing the printed label L (see aftermentioned FIG. 5) depicting the weight measuring result (step ST80). Then, by outputting a display signal based on the generated print data to the display 38, a preview of the label image is made to show an outlook of the printed label L (see the step ST90).

Then, if the user presses a print button (not depicted) provided in the operation part 37 of the mobile terminal 30, then the CPU 35 generates a print command including the print data generated in the step ST80 to instruct the preparation of the printed label L corresponding to measuring data, and outputs the same to the printing label preparing apparatus 100 (step ST100).

The printing label preparing apparatus 100 receives the outputted print command (step SP110). Then, with the print command received, the printing label preparing apparatus 100 retrieves the print data included in the print command into the receiving buffer 48A of the RAM 48. Then, based on the retrieved data, the thermal head 25, the platen roller 26 and the like are controlled via the head drive circuit 205 and the platen roller drive circuit 209 by a publicly known method, to carry out the corresponding print on the tape for label-print 20A. By virtue of this, the printed label L is prepared (step SP120).

Figure 5:
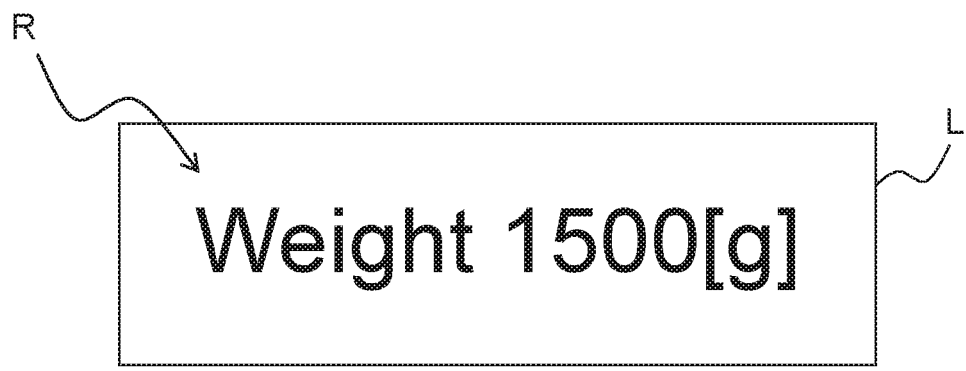
FIG. 5 is a diagram depicting an example of a printed label to be prepared.

FIG. 5 depicts an example of the printed label L prepared in the case where the measurement object is weighed 1,500 grams on the platform 200A of the weight measuring apparatus 200. Therefore, the text characters "Weight 1500 [g]" are printed as printed words R on the printed label L to show the result of measuring the weight.

The present embodiment obtains the following effects.

That is, the printing label preparing apparatus 100 according to this embodiment is connected to both the weight measuring apparatus 200 and the mobile terminal 30 in an information transmittable and receivable manner. Then, based on the user's operation on the mobile terminal 30, the printing label preparing apparatus 100 carries out printing in correspondence with the weight measuring result from the weight measuring apparatus 200. By virtue of this, differently from the case where the printer is used as a dedicated device being integrally linked with a weight measuring apparatus, it is also possible to use the printing label preparing apparatus 100 for other purposes than for the weight measuring apparatus 200 to carry out weight measuring (for example, it is possible to prepare an appropriate printed label based on the print data generated for another purpose according to an appropriate operation on the mobile terminal 30). Further, the printing label preparing apparatus 100 is connected to the mobile terminal 30. Therefore, differently from the case where the printer is connected to a non-portable PC terminal, it is possible for the user to carry out various operations for the printing based on the weight measuring result without needing to choose place.

Further, in this embodiment, the weight measuring apparatus 200 sends the weight measuring data for the measurement object repeatedly at the predetermined period. Therefore, depending on the timing for the user to deal with the measurement object, it is undesirably possible to print with a different measuring data from the weight measuring data for the measurement object with which the user desires to print.

Figure 6:
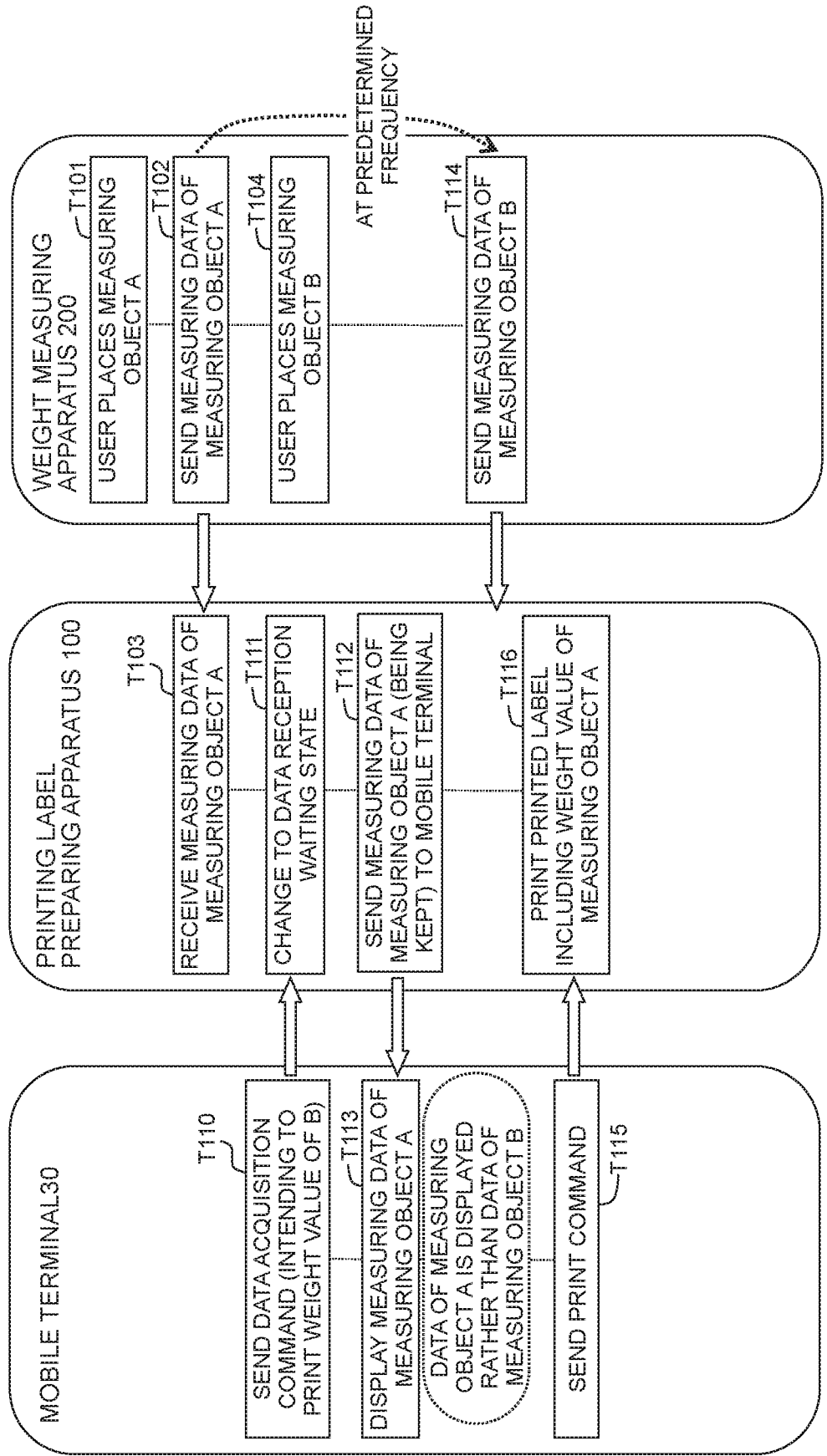
FIG. 6 is an illustrative view for explaining a temporal data flow in a comparative example.

For example, as depicted in FIG. 6, such a configuration is considered as a comparative example that the printing label preparing apparatus 100 having received the data acquisition command from the mobile terminal 30 sends to the mobile terminal 30 the measuring data, which has already been acquired from the weight measuring apparatus 200 and kept at that time. In this comparative example, for example, in a state where the user has placed the measurement object A on the platform 200A (T101), the measuring data for the measurement object A is sent to the printing label preparing apparatus 100 (T102).

Then, in order to obtain the weight measuring result for a measurement object B different from the measurement object A (and further to prepare a printed label corresponding to that measuring result), the user replaces the measurement object A on the platform 200A with the measurement object B (T104). Then, the user presses the data acquisition button. On this occasion, as described earlier on, the data acquisition command is outputted from the mobile terminal 30 to the printing label preparing apparatus 100 (T110). The printing label preparing apparatus 100 acquires the data acquisition command, and then comes into the aforementioned data reception waiting state (T111).

Then, in the state T104, if the user places the measurement object B on the weight measuring apparatus 200 at a time right after the measuring data for the measurement object A is sent at the T102 from the weight measuring apparatus 200 to the printing label preparing apparatus 100, then before the next measuring data (the measuring data for the measurement object B) is sent to the printing label preparing apparatus 100 according to the predetermined frequency (T114), the measuring data for the measurement object A kept by the printing label preparing apparatus 100 at that time is sent to the mobile terminal 30 (T112).

As a result, on the mobile terminal 30, the label image based on the measuring data for the measurement object A sent in is previewed (T113). That is, although the user requests for a label image based on the measuring data for the measurement object B, the label image based on the measuring data for the measurement object A is displayed. As a result, if the user presses the print button to send the print command thereafter (T115), then it is undesirably possible to print out the printed label L based on the measuring data for the measurement object A which is different from what is intended by the user (T116).

In view of the above, however, in this embodiment, after shifting to the data reception waiting state as depicted in FIG. 7, when the printing label preparing apparatus 100 receives in the measuring data (the second measuring data) from the weight measuring apparatus 200 for the first time (T120), that measuring data is sent to the mobile terminal 30 (T122). By virtue of this, on the mobile terminal 30, based on the send-in measuring data for the measurement object B, the label image is displayed (T123). In other words, after coming into the data reception waiting state, the printing label preparing apparatus 100 does not send to the mobile terminal 30 the measuring data (the first measuring data) received before the measuring data (the second measuring data) for the first time, among the measuring data sent in from the weight measuring apparatus 200 at a predetermined frequency. By virtue of this, when the user presses the data acquisition button, i.e., at the moment when the user needs the data (see the step ST20 in FIG. 4), it is possible to know of the latest correct measuring data. Then, by the user's manipulation of the print button thereafter to send the print command (T126), it is possible for the user to prepare the printed label L corresponding to the measuring data for the measurement object B just as intended (T127). As a result, it is possible to prevent printing out a different measuring data from what is intended by the user as described earlier on.

Further, the printing label preparing apparatus 100 does not send any measuring data to the mobile terminal 30 until receiving the measuring data for the first time from the weight measuring apparatus 200 after coming into the data reception waiting state. By virtue of this, it is also possible to obtain such an effect as follows.

That is to say, in FIG. 8 depicting a different case from that of FIG. 7, with the measurement object B being placed on the platform 200A, as the user presses the data acquisition button, the printing label preparing apparatus 100 stays in the data reception waiting state (T110 and T111). Then, the printing label preparing apparatus 100 sends the measuring data received from the weight measuring apparatus 200 for the first time (T114 and T120) to the mobile terminal 30 and, on the mobile terminal 30, the label image is displayed (T122 and T123). At this time, such a case is taken into consideration that the user has removed the measurement object B from the platform 200A (T124). In this case, the measuring data showing the weighing value of "data 0" is sent from the weight measuring apparatus 200 periodically (T125).

In this embodiment, even in such a case as above, there is also displayed to the user the measuring data (corresponding to the measurement object B) right after the data acquisition button is pressed (T123). By virtue of this, in the same manner as described earlier on, when the user presses the data acquisition button, i.e., at the moment when the user needs the data (see the step ST20 in FIG. 4), it is possible to know of the latest correct measuring data. Then, by the user's manipulation of the print button thereafter to send the print command (T126), it is possible for the user to prepare the printed label L corresponding to the measuring data for the measurement object B just as intended even though the measuring weight has changed on the platform 200A as described earlier on (T127).

Note that the present teaching is not limited to the above embodiment but various changes and modifications may be applied thereto without departing from the true spirit and technical thoughts of the teaching. Hereinbelow, a few modified embodiments will be explained.

[The Case Corresponding to an Unstable Measuring Data from the Weight Measuring Apparatus]

There is a case where the value of the measuring data outputted from the weight measuring apparatus 200 is unstable (variable) due to various situations and circumstances such as the measurement object being placed on the platform 200A before long, or the measurement object vibrating on the platform 200A, or the like. A modified embodiment capable of handling such cases will be explained in reference to FIGS. 9A and 9B corresponding to FIG. 4.

According to this modified embodiment, after the same step SP10, step ST20, and step SP30 as in FIG. 4, the printing label preparing apparatus 100 shifts to the data reception waiting state from the instruction waiting state (step SP40), and receives (identifies) the measuring data (an example of the second measuring data) outputted from the weight measuring apparatus 200. On this occasion, however, the measuring data may be unstable as described above. Therefore, the printing label preparing apparatus 100 stands by while repeatedly receiving (identifying) the measuring data through a predetermined period (an example of the first predetermined period) in a step SP50' after the step SP40.

Note that on this occasion, the printing label preparing apparatus 100 outputs a standby instruction to the mobile terminal 30 to indicate that it is impossible or difficult to prepare the printed label L immediately because the value of the measuring data is unstable (that is, it is necessary to stand by for a while). On receiving the standby instruction (step ST55), the mobile terminal 30 displays a corresponding standby indication on the display 38 (step ST56).

Then, during the predetermined standby period, the printing label preparing apparatus 100 determines whether or not the measuring data sent from the weight measuring apparatus 200 is stabilized (step SP57). In particular, if the measuring data (the second measuring data) sent from the weight measuring apparatus 200 via the USB cable 159 includes a status indicating the contents of the data are stable or unstable, then the determination is made based on the status. For example, the printing label preparing apparatus 100 stands by through the predetermined period if the status of the received measuring data is "unstable" and, furthermore, determines whether or not the status of the received measuring data has become "stable" in this period.

If the measuring data (the second measuring data) is stabilized in the predetermined period (SP57: Yes), then the stabilized measuring data is sent to the mobile terminal 30 in a step SP60. Thereafter, through the step ST70 to the step ST100 and the step SP110 as in the aforementioned embodiment, the corresponding printed label L is prepared in a step SP120.

Note that prior to sending the stabilized measuring data, an appropriate instruction may be outputted to the mobile terminal 30 to indicate that the standby state is ended such that in the mobile terminal 30. Then, an appropriate corresponding display may be performed on the display 38 to request the user to send the data acquisition command again from the mobile terminal 30. In such a case, after the printing label preparing apparatus 100 receives the transmitted data acquisition command, the stabilized measuring data is sent to the mobile terminal 30 to prepare the printed label L in the same manner as in the aforementioned embodiment.

On the other hand, if the measuring data (the second measuring data) is not yet stabilized, that is, if the status of the measuring data has not yet become "stable" in the predetermined period of standby (SP57: No), then the printing label preparing apparatus 100 generates a time-out notification and sends the same to the mobile terminal 30 to indicate the non-stabilization in the predetermined period (step SP130). The mobile terminal 30 receives the time-out notification (step ST140), and then performs a corresponding error display on the display 38 (step ST145).

In this modified embodiment, if the measuring data is not yet stabilized after the system turns to the data reception waiting state, then the printing label preparing apparatus 100 stands by through the predetermined period and determines whether or not the measuring data is already stabilized. By virtue of this, even for an unstable weight measuring result of the measurement object from the weight measuring apparatus 200, it is still possible to identify that unstable state without overlooking the same, so as to take some suitable measure therefor. That is, in this modified embodiment, if stabilization of the measuring data is determined, then the stabilized measuring data is sent to the mobile terminal 30. In this manner, by sending to the mobile terminal 30 the stabilized measuring data but not sending any unstable measuring data, it is possible to carry out the correct printing according to the actual weight of the measurement object.

Further, especially in this modified embodiment, if stabilization of the measuring data is not determined, then the time-out notification is sent to the mobile terminal 30. By virtue of this, it is possible to notify the user that the actual weight of the measurement object cannot be correctly measured so that the correct printing cannot be carried out.

Note that in the above manner, if the second measuring data is not stable in the predetermined period, then instead of the time-out notification as described earlier on, an average value or intermediate value may be determined for a plurality of second measuring data during the predetermined period, and then that determined value (an example of the third measuring data) may be sent to the mobile terminal 30. In this case, the third measuring data is received in the mobile terminal 30 in the step ST70. Thereafter, through the same step ST80 to step ST100 and step SP110 as in the embodiment, the corresponding printed label L is prepared (to the third measuring data) in the step SP120.

Because the average value or intermediate value of the plurality of second measuring data within the predetermined period is sent to the mobile terminal 30, even if it is difficult to correctly measure the actual weight of the measurement object, it is still possible to prepare the printed label L by printing on the tape for label-print 20A with a value as close as possible to the actual weight.

Further, if the measuring data does not include the aforementioned status indicating "stable" or "unstable", then instead of the aforementioned method, a calculation may be performed to see whether or not the values of a plurality of second measuring data lie within a predetermined range (for example, plus or minus 50 grams or the like), so as to determine the stabilization if the values lie within the predetermined range.

[The Case Corresponding to a Communication Disruption (Defection) with the Weight Measuring Apparatus]

There are cases where it is impossible or difficult for the printing label preparing apparatus 100 to receive (identify) the measuring data outputted from the weight measuring apparatus 200 due to various situations and circumstances such as defection in the USB cable 159, connecting defection of the USB cable 159 to the printing label preparing apparatus 100, or the like. A modified embodiment capable of handling such cases will be explained in reference to FIGS. 10A and 10B corresponding to FIG. 4 and FIGS. 9A and 9B.

According to this modified embodiment, after the same step SP10, step ST20, and step SP30 as in FIG. 4, the printing label preparing apparatus 100 shifts to the data reception waiting state from the instruction waiting state in the step SP40. Then, the printing label preparing apparatus 100 waits to receive (identify) the measuring data (an example of the second measuring data) outputted thereafter from the weight measuring apparatus 200. On this occasion, however, there are cases there it is impossible or difficult to receive (identify) the measuring data as described above. In this modified embodiment, the printing label preparing apparatus 100 stands by while trying to receive (identify) the data through a predetermined period (an example of the second predetermined period) in a step SP50" after the step SP40, so as to determine whether or not it is possible to receive (identify) the measuring data from the weight measuring apparatus 200 (step SP58).

If the measuring data (the second measuring data) can be received (identified) in the predetermined period (SP58: Yes), then the stabilized measuring data is sent to the mobile terminal 30 in the step SP60. Thereafter, through the same step ST70 to step ST100 and step SP 110 as in the embodiment, the corresponding printed label L is prepared in the step SP120.

On the other hand, if the measuring data (the second measuring data) cannot be received (identified) in the predetermined period (SP58: No), then the printing label preparing apparatus 100 generates a connection error notification and sends the same to the mobile terminal 30 to indicate the failure in receiving (identifying) the data in the predetermined period (step SP150). The mobile terminal 30 receives the connection error notification (step ST160), and then performs a corresponding error display on the display 38 (step ST165).

In this modified embodiment, it is possible to notify the user that there is some problem in the communication connection between the weight measuring apparatus 200 and the printing label preparing apparatus 100.

[Other Cases]

In the above explanation, such a case was taken as an example that the weight measuring apparatus 200 sends the measuring data to the printing label preparing apparatus 100 at the predetermined period. However, without being limited to that, such a configuration may be employed that the weight measuring apparatus 200 sends the measuring data to the printing label preparing apparatus 100 accordingly at the time of receiving a transmission request (for example, an appropriate command) from the printing label preparing apparatus 100.

Further, in the above description, the arrow depicted in FIG. 3 illustrates an example of signal flow but does not limit the direction of the signal flow thereto.

Further, the sequence diagrams (time chart) depicted in FIG. 4, FIGS. 9A, 9B, and FIGS. 10A and 10B do not limit the present teaching to the procedures depicted therein. Hence, addition or deletion of procedures and/or modification of sequential orders may be applied without departing from the true spirit and technical thoughts of the teaching.

Further, the methods according to the above embodiment and modified embodiments may be used in appropriate combinations.

Furthermore, although without exemplifications, various changes and modifications are applicable to the present teaching for carrying out the teaching without departing from the true spirit and scope of the teaching.

What is claimed is:

1. A printer configured to communicate with a weight measuring apparatus and a mobile terminal, the weight measuring apparatus being configured to transmit a measuring data of weight of a measurement object, the mobile terminal being configured to transmit a data acquisition command requesting for transmission of the measuring data, the printer comprising:
   a head configured to perform printing on a print medium; and
   a controller,
   wherein the controller is configured to:
   receive the data acquisition command from the mobile terminal;
   change a state of the printer from an instruction waiting state to a data reception waiting state after receiving the data acquisition command, the instruction waiting state being a state in which a first measuring data transmitted from the weight measuring apparatus is not received by the printer;
   receive a second measuring data transmitted from the weight measuring apparatus after changing the state of the printer from the instruction waiting state to the data reception waiting state;
   transmit the second measuring data to the mobile terminal;
   receive a print command corresponding to the second measuring data from the mobile terminal; and
   control the head based on the received print command to perform the printing, on the print medium, corresponding to the second measuring data.

2. The printer according to claim 1, wherein the weight measuring apparatus is configured to transmit the measuring data repeatedly at a predetermined period.

3. The printer according to claim 1, wherein the controller is further configured to stand by for a first predetermined period after changing the state of the printer to the data reception waiting state and to determine whether the second measuring data received from the weight measuring apparatus during the first predetermined period is stabilized.

4. The printer according to claim 3, wherein based on determining that the second measuring data received from the weight measuring apparatus during the first predetermined period is stabilized, the controller is configured to transmit, to the mobile terminal, the second measuring data which is stabilized.

5. The printer according to claim 4, wherein based on determining that the second measuring data received from the weight measuring apparatus during the first predetermined period is not stabilized, the controller is configured to transmit a time-out notification to the mobile terminal.

6. The printer according to claim 4, wherein based on determining that the second measuring data received from the weight measuring apparatus during the first predetermined period is not stabilized, the controller is configured to transmit, to the mobile terminal, a third measuring data determined based on the second measuring data received from the weight measuring apparatus during the first predetermined period.

7. The printer according to claim 1,
   wherein the controller is further configured to:
   determine whether a state in which the second measuring data transmitted from the weight measuring apparatus is not identified is continued for a second predetermined period after changing the state of the printer to the data reception waiting state; and
   transmit a connection error notification to the mobile terminal based on determining that the state in which the second measuring data transmitted from the weight measuring apparatus is not identified is continued for the second predetermined period.

* * * * *